(12) United States Patent
Schoenfeld

(10) Patent No.: US 7,044,408 B2
(45) Date of Patent: May 16, 2006

(54) TWIN SPINNER SPREADING APPARATUS

(75) Inventor: Jeffery Schoenfeld, Chilliwack (CA)

(73) Assignee: Ty-Crop Investments Ltd., Rosedale (CA)

( * ) Notice: Subject to any disclaimer, the term of this patent is extended or adjusted under 35 U.S.C. 154(b) by 0 days.

(21) Appl. No.: 11/049,950

(22) Filed: Feb. 4, 2005

(65) Prior Publication Data

US 2005/0173568 A1    Aug. 11, 2005

(30) Foreign Application Priority Data

Feb. 11, 2004    (CA) .................................. 2457270

(51) Int. Cl.
*A01C 15/00*    (2006.01)
(52) U.S. Cl. ...................... 239/659; 239/661; 239/667; 239/665; 239/668; 239/673; 404/110; 404/108
(58) Field of Classification Search ................ 239/152, 239/657, 659, 661, 663, 665, 666, 667, 668, 239/669, 672, 673; 404/110, 108
See application file for complete search history.

(56) References Cited

U.S. PATENT DOCUMENTS

| | | | |
|---|---|---|---|
| 3,618,824 A | 11/1971 | Seymour et al. | |
| 3,790,090 A | 2/1974 | Lorenc et al. | |
| 3,889,883 A | 6/1975 | Anderson | |
| 4,597,531 A | 7/1986 | Kise | |
| 5,618,002 A | 4/1997 | Cervelli et al. | |
| 5,947,391 A * | 9/1999 | Beck et al. ................. | 239/677 |
| 6,027,053 A | 2/2000 | Anderson et al. | |
| 6,149,079 A | 11/2000 | Kinkead et al. | |
| 6,220,532 B1 * | 4/2001 | Manon et al. .............. | 239/672 |
| 6,508,419 B1 * | 1/2003 | Kinkead et al. ............ | 239/668 |
| 6,517,281 B1 | 2/2003 | Rissi | |
| 6,817,552 B1 | 11/2004 | Kinkead et al. | |

FOREIGN PATENT DOCUMENTS

GB    2120 914 A    12/1983
WO    WO 92/15755 A1    9/1992

* cited by examiner

*Primary Examiner*—Dinh Q. Nguyen
(74) *Attorney, Agent, or Firm*—Miles & Stockbridge P.C.; Edward J. Kondracki

(57) ABSTRACT

The invention relates to a broadcast apparatus of the type used in association with a material transporter and includes two components in the form of a chassis section which carries spinner units and a hopper section for directing material received from the transporter into the spinner units. The two components are constructed for easy attachment to permit ready separation and re-connection whereby hopper sections which direct the material differently into the spinner units can be quickly substituted and further the attachments parts of the two components permit positioning of the components in different relationships. The spinner units have material engaging blades, the positioning of which on the spinner discs can be varied to affect the engagement of the blades with the material. The ability to accomplish a variety of operating parameters enables the broadcast apparatus to evenly distribute on the ground surface materials of a significantly different characteristics.

18 Claims, 9 Drawing Sheets

TWIN SPINNER SPREADING APPARATUS

FIELD OF INVENTION

This invention relates to a broadcast type apparatus for spreading material over the ground surface, and more particularly, to a broadcast apparatus for attachment to a material transporter of the pull-type or of a self propelled nature for receiving material from the material transporter and distributing the material over a path on the ground during travel of the material transporter.

BACKGROUND OF THE INVENTION

Material transporters are used for spreading numerous types of materials over a ground surface, and spreaders of a particular type have been developed for use of turf maintenance, such as those used in the care of golf courses, where special attention must be taken to provide very even distribution of the material so as to leave the grass and adjacent areas in a well groomed condition. Moreover, it is useful that the same equipment used in making fine applications of materials such as light soil, sand and fertilizer on the greens and fairways can also be used in making even distribution of other materials, which may have other characteristics, including coarse materials, such as crushed rock, drain rock and other materials utilized as path materials. It is also desirable in some areas to have equipment capable of neatly spreading other bulky material or those which tend to clump or cling together such as mower clipping, bark material or aerified lawn cores.

Many of the existing material transporters and associated broadcasting units are of a design which have limited abilities in spreading different materials or in switching from making light to heavy applications in a single pass. While various units having completely different operating characteristics have been developed for separate attachment to the rear of available material transporters for handling certain materials of varying nature, the procurement and maintenance of such units add significantly to the cost of maintaining turf.

SUMMARY OF INVENTION

It is an object of the present invention to provide a broadcast apparatus capable of effectively spreading a wide variety of materials for attachment to available types of material transporters.

According to one aspect of the invention, there is provided a broadcast apparatus for attachment to a material transporter for receiving material from the material transporter and distributing the material on a path along a ground surface as the material transporter travels over the ground surface, the material transporter being of the type having attachment mounting means for the broadcast apparatus thereon. The broadcast apparatus includes a chassis section, at least one spinner unit, and at least a first hopper section. The chassis has upper mounting means, a lower horizontal frame portion, and frame members suspending the lower frame portion spaced below the upper mounting means. The spinner unit or units are mounted on the lower frame portion and each includes a power driven disc having a substantially horizontal circular, upper surface, and a plurality of upright blade members affixed to the upper surface of the disc. The hopper section includes a hopper portion defining an upper opening for receipt of material from the material transporter and a lower outlet above the upper surface of the disc, and hopper mounting means disposed for engagement with the upper mounting means of the chassis section. Inter-connecting means are provided for detachably connecting the mounting means of the hopper section to the mounting means of the chassis section in a plurality of positions for permitting variable placement of the lower outlet of the hopper section relative to the upper surface of the disc. Either the chassis or the hopper section provide surfaces for interaction with the attachment mounting means of the material transporter for detachably mounting the broadcast apparatus on the material transporter.

In a preferred embodiment of the invention, there is provided a pair of spinner units mounted on a horizontal frame member in side-by-side relation, and each blade on the discs is provided with a pair of adjustable attachment means spaced along the length thereof permitting adjustment of the distance of opposite ends of the blade away from a common radial line extending outward from the center of the circular disc.

According to another aspect of a specific embodiment of the present invention, a spinner shield member is carried by the lower frame in front of forward portions of the spinner units. In cross section the spinner shield member has a right angle shape formed by an upright flange joined to a bottom horizontal flange. The upright flange projects upwardly to an upper edge at least at the level of the upper edges of the blades, and the horizontal flange extends rearwardly below forward portions of said discs and has a series of openings disposed therethrough approximately below the periphery of said discs of said spinner units.

Preferably, the broadcast apparatus includes a second hopper section including mounting rails of the same structure as the first hopper section for interchanging therewith on the chassis section. The hopper portion of the first hopper section and a hopper portion of the second hopper section are differently structured to provide interior structures for causing different flow characteristics of material therethrough from the upper inlet opening to at least one lower outlet opening. While the hopper portion of the first hopper section may have downwardly converging side walls and downwardly diverging front and rear walls, with these walls defining a single lower opening elongated in the transverse direction and extending across portions of both of the circular discs of said pair of spinner units, the hopper portion of said second hopper section may have a pair of downwardly converging side walls with each side wall having an opposed center wall so that the hopper portion forms a pair of side-by-side lower outlets, one each being located over a portion of one of the circular discs of the pair of spinner units.

BRIEF DESCRIPTION OF DRAWINGS

The accompanying drawings show different embodiments of the invention, wherein.

DETAILED DESCRIPTION OF INVENTION

Figure 2:
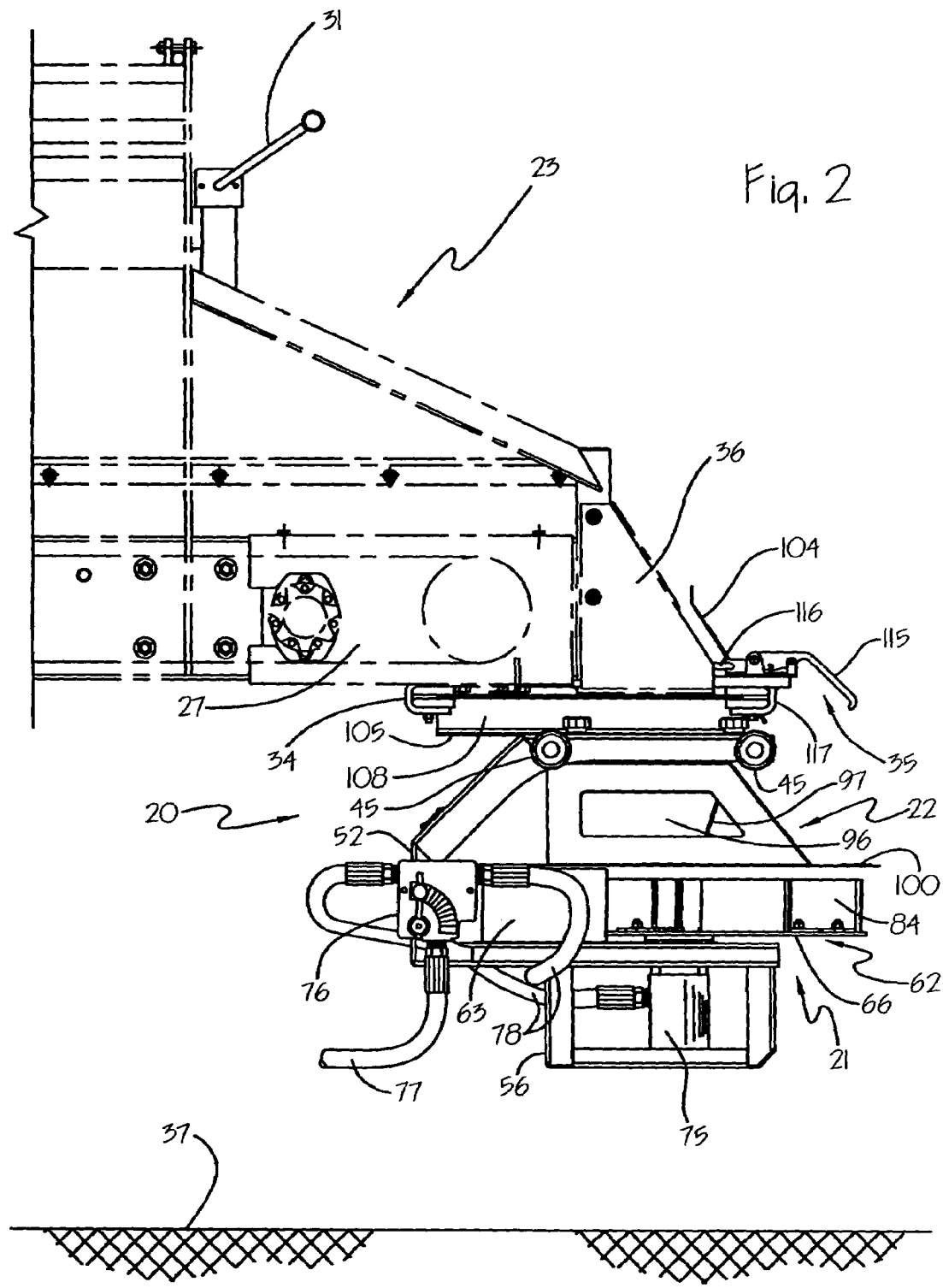
FIG. 2 is a left side elevational view of the embodiment as shown in FIG. 1 and illustrating the broadcast apparatus as attached to a material transporter.
Figure 4:
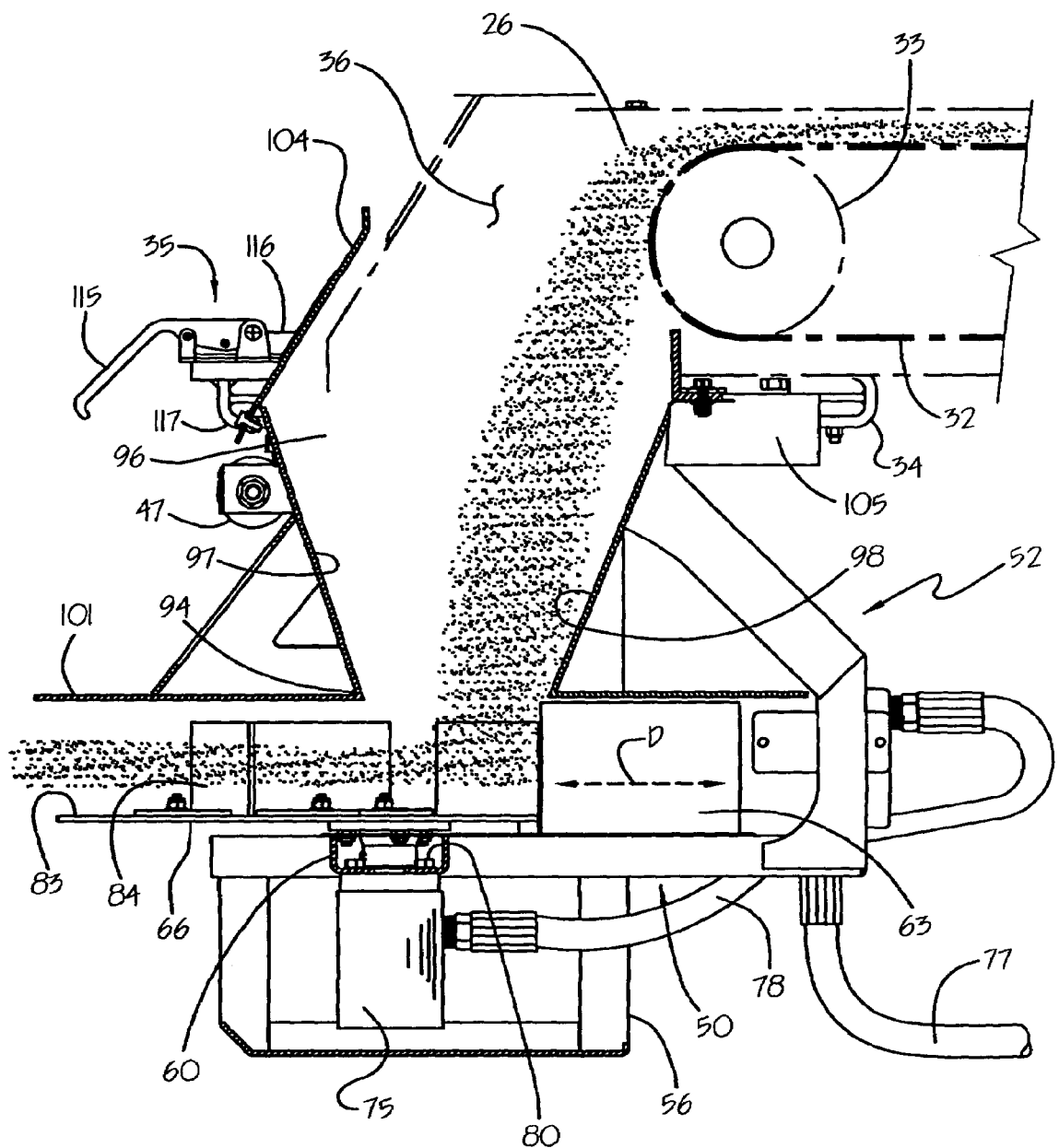
FIG. 4 is an elevational cross section view as seen from line 4—4 of FIG. 3 but illustrating the broadcast apparatus in relation to the material transporter during operation thereof.
Figure 12:
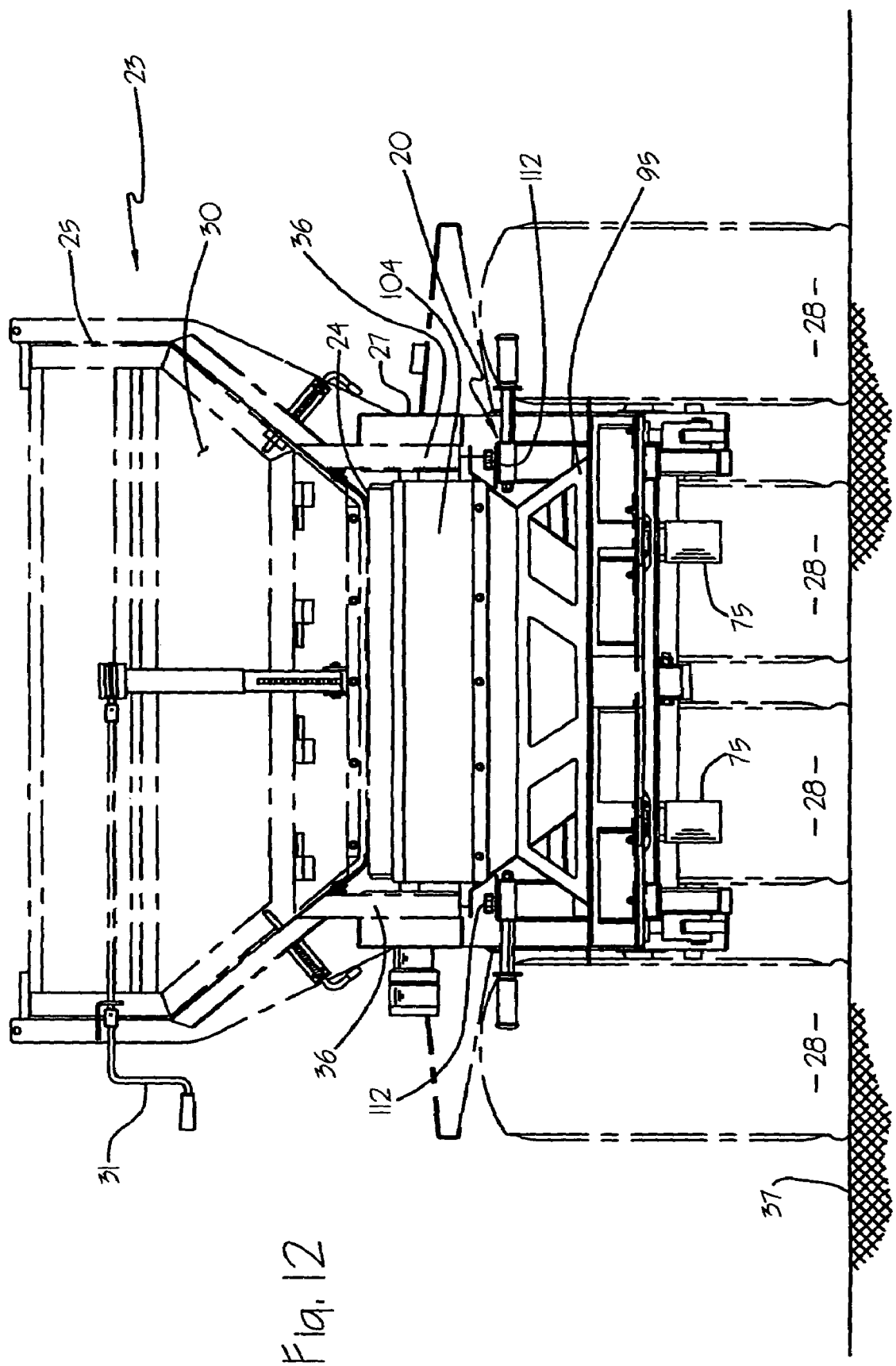
FIG. 12 is a rear view of a spreader with the broadcast apparatus of the invention mounted thereon, but with the clamping means for attaching the broadcast apparatus removed for the sake of clarity.

In the drawings, the broadcast apparatus of the present invention is generally denoted by the reference number 20, and consists of chassis section 21 and a separate hopper section 22, which, as described below, are readily separable and are manually movable to different locked positions relative to each other. The broadcast apparatus 20 is designed for secure attachment to the rear of a material transporter 23, as illustrated in FIGS. 2, 4 and 12, from which a material 26 is fed to the broadcast apparatus 20 by a conveyor 24, such as an endless belt conveyor, from a storage hopper 25 carried by the material transporter 23. The material transporter 23 may be of a number of forms of spreaders, of both the pull-type or self-propelled type. As will be described in more detail, the illustrated embodiments of the invention are designed for attachment to the rear of a spreader, such as Model Number MH-400, manufactured and sold by TY-CROP Manufacturing Ltd.

As illustrated in FIG. 12, the storage hopper 25 of the material transporter 23 is carried on a frame 27 mounted on ground engaging wheels 28. The storage hopper 25 has a rear gate 30 which may be raised or lowered manually through operation of a crank 31 readily accessible at the left hand side of the material transporter 23. As the gate 30 is raised, a space is developed between a lower edge of the gate and a rearwardly travelling belt 32 of the conveyor 24. Accordingly, a layer of material 26 of a selected depth on an upper surface of the belt 32 is carried by the belt 32 from within the storage hopper 25 toward the rear of the material transporter 23 until it reaches a point where the belt 32 passes over a rear roller 33 (FIG. 2). At this point, the material 38 tumbles into the hopper section 22 of the broadcast apparatus 20 of the invention. Thus, the setting of the height of the gate 30 above the belt in relation to a set speed of travel of the belt 32, which may also be variable, determines the rate of delivery of the material 26 from the storage hopper 25 of the material transporter 23 to the broadcast apparatus 20. At the rear of the material transporter 23, there are provided clamp means for detachably connecting various attachments, such as the broadcast apparatus 20, to the material transporter 23. The clamping means includes a pair of forward support units 34,34 affixed to the frame 29 of the material transporter 23 and a pair of rearward manually operable locking clamps 35,35 carried at the rear end of rearwardly projecting side walls 36 of the spreader. When the broadcast apparatus 20 is fixed in position by the locking means, it is held a distance above ground surface 37 over which the material transporter 23 travels (FIG. 12). Accordingly, as the material transporter 23 moves forward along a path of travel over a ground surface, the material 26, such as soil, sand, mulch, crushed rock, etc. dropping into the broadcast apparatus 20 from the material transporter 23 is distributed over a pre-selected width in an pattern of even density as will be described in more detail below.

Figure 5:
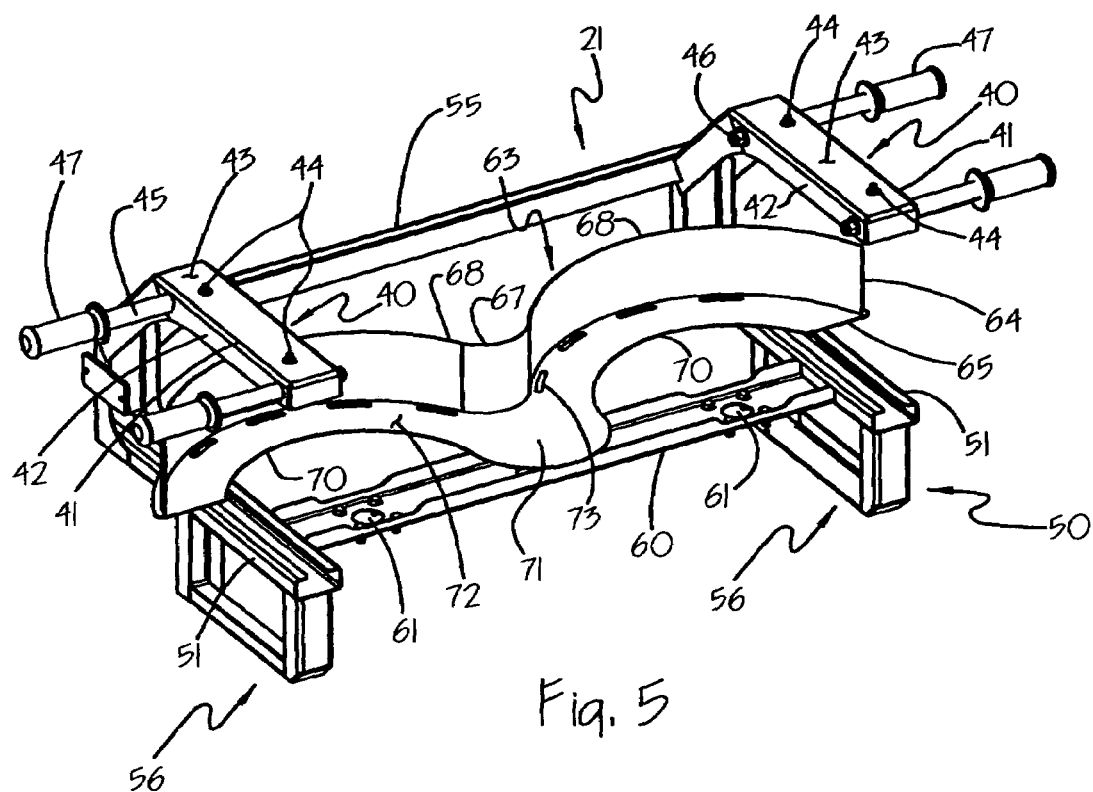
FIG. 5 is a rear perspective view of a chassis section of the broadcast apparatus prior to the mounting of spinner units thereon.

Features of the chassis section 21 of the broadcast apparatus can be more clearly seen in FIGS. 5 to 8. The chassis section 21 in the main may be formed by the welding of commercially available sections of steel. The chassis section 21 includes mounting means in the form of a pair of transversely spaced horizontal upper rails 40,40, which are parallel and extend in the fore and aft direction of the apparatus. The rails 40,40 have an upper web 41 and downwardly projecting spaced side flanges 42,42, the upper web 41 providing a flat horizontal upper surface 43 of each rail 40 (FIG. 5). Projecting upwardly from the upper surface 43 of each rail 40 is a pair of threaded studs 44,44, which are affixed to the upper web 41, the threaded studs being spaced along the upper surface 43 in the longitudinal direction of the upper rail 40. A pair of rods which form handles 45,45 extend through the side flanges 42,42 of each upper rail 40 and are secured thereto by means such as nuts 46 or welding and the like. The handles 45,45 which are provided with grips 47 at their outer ends project laterally from the rails 40,40 at opposite sides of the chassis section 21. As is described in more detail, the handles are readily accessible to the operators of the material transporter 23 for mounting the complete broadcast apparatus on the rear of the material transporter 23, or for adjusting the chassis section 21 and hopper section 22 relative to each other.

The chassis section 21 further provides a lower frame portion 50 including lower rails 51,51 which are shown as flanged channel sections spaced a distance below the upper rails 40,40 and extending parallel thereto. The lower rails 51,51 are suspended from the upper rails 40,40 by upright frame members 52,52 each formed by a lower vertical section 53, and rearwardly slanted upper section 54 affixed one each to a top of the vertical sections 52,52, such as by welding. Each vertical section 53 of the frame member 52 is affixed to a forward end of one of the lower rails 51, which projects a significant distance forward of the front end of its associated upper rail 40. An upper end of each slanted upper section 54 is affixed to the front end of the associated upper rail 40. A transversely extending horizontal brace member 55 is affixed at opposite ends to the upright frame members 52,52.

Each of the lower rails 51,51 is provided with a stand member 56 on which the chassis section 21 rests when the chassis section or the assembled broadcast apparatus 20 as a whole is demounted from the material transporter 23. Each stand 56 includes a pair of vertical support members 57,57 affixed at upper ends to one of the lower rails 51,51 at a spaced distances therealong. A lower horizontal ground engaging support member 58 is welded between lower ends of the vertical support members 57,57. The lengths of the vertical support members are selected to ensure that the lower frame section and the associated components are held sufficiently above the ground surface to prevent damage thereof when the broadcast apparatus 20 is removed from the material transporter 23.

Extending transversely between the lower rails 51,51, and secured at opposite ends thereto is a spinner supporting frame member 60, which is provided with a pair of appropriately spaced openings 61,61 at locations where a pair of spinner units 62,62 are mounted as more fully described hereinafter. Secured to the top surfaces of the lower rails 51,51 at either end and also to the central portion of the frame member 60 is a spinner shield member 63. In cross section, the shield member has a right angle shape consisting of a vertical upright flange 64 and a horizontal bottom flange 65. In plan view, the upright vertical flange 64 has a pair of arcuate end sections 68, each of which have a curvature radius slightly larger than the radius of flat discs 66,66 of the two spinner units 62,62, the pair of arcuate end sections 68, 68 being joined by a reverse curvature section 67 at the center of the shield member. The horizontal bottom flange 65 has bottom portions 70,70 extending a distance rearwardly of each arcuate end section 68 of the upright vertical flange 64, and bottom portions 70,70 are connected by a central enlarged bottom portion 71 extending rearwardly from the reverse curved section 67 of the upright vertical flange 64. When the spinner units 62,62 are installed on the transverse frame member 60, the discs 66,66 are spaced slightly above an upper surface 72 of the horizontal flange 65 in the areas of rearwardly extending bottom portions 70,70 of the horizontal flange 65. Located in the horizontal bottom flange 65 immediately within the pair of arcuate end sections 68,68 of the upright flange 64, and approximately on the same radius as the periphery of the discs 66,66 are series of openings 73, through the horizontal flange. The openings 73 are spaced and are preferably elongated as illustrated. As is described further below, the openings 73 allow the escape of particles of material which enters the space between the discs 66,66 and the top surface 72 of the horizontal bottom flange 65 which particles otherwise accumulate in that space. It has been found that ridding that space of such accumulation greatly reduces abrasion of the flanges and the discs.

Each spinner unit 62 includes a hydraulic motor 75, supplied with pressurized hydraulic fluid through a control valve 76 (FIG. 2) mounted on upright frame member 52 on the left side of the chassis section 21. The hydraulic fluid is supplied through hydraulic lines 77 from a hydraulic pumping system (not shown) carried by either the material transporter 23 or from a towing vehicle (not shown). The quantity of flow of fluid from the control valve 76 is varied by the setting of the control valve which sets the speed of rotation of the spinner units 62,62, the connection of the hydraulic lines to the pair of hydraulic motors 75,75 being such that the motors rotate in opposite directions at the same speed as indicated by arrows A,A in FIG. 8.

Figure 9:
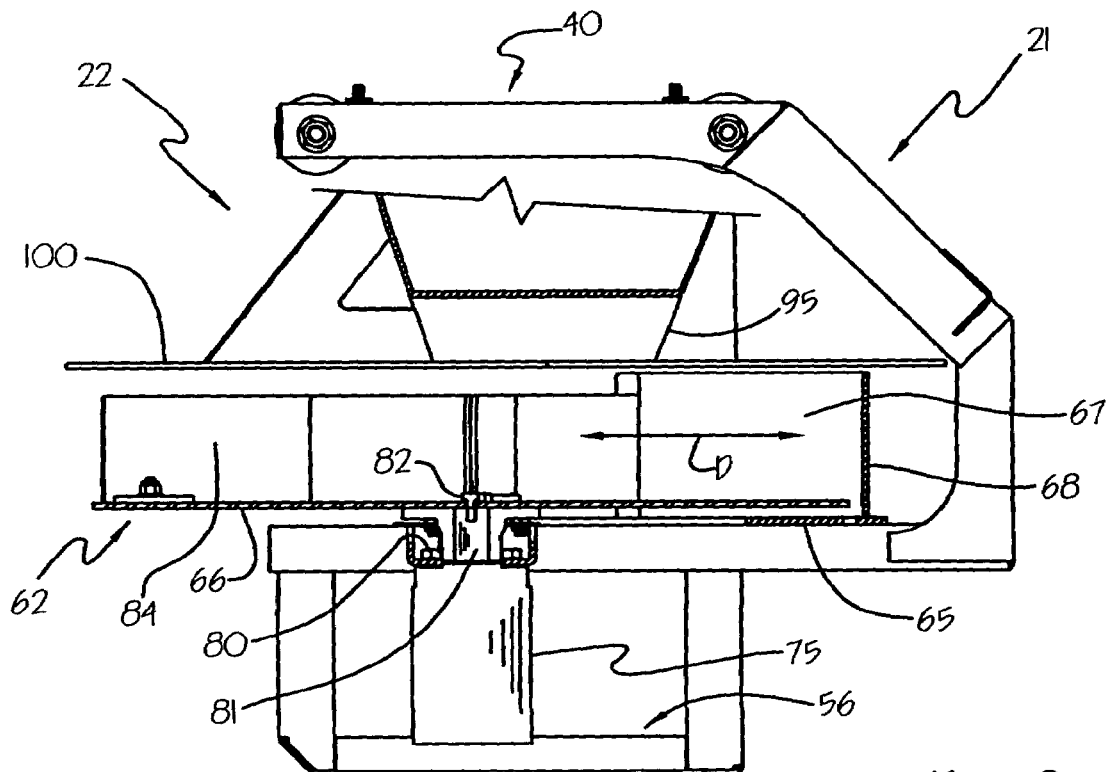
FIG. 9 is a cross sectional view of the chassis section of FIG. 8 as seen from the line 9—9 of FIG. 8, but with the hopper section in place so as to illustrate the relative position of a lower portion of the hopper section to the rotating disc of the spinner unit.

Each spinner unit 62 is connected to the transverse frame member 60 by way of bolts 80 which pass through bolt holes in the frame member 60 and are screwed into threaded holes in the casing of the motors 75,75. Each motor 75 is disposed beneath the frame and having an output shaft 81 which projects up through one of the openings 61,61 in the frame member 60 (FIG. 9). Each disc 66 is fixed to the upper end of shaft 81 by way of a bolt connection 82 for rotation therewith.

As previously described each of the discs 66 has its forward portion located within one of the pair of arcuate end sections 68 of the upright flange 64 of the spinner shield member 63, and these portions of the discs are spaced slightly above the rearwardly extending bottom portion 70 of the horizontal flanges 65. Located on upper surface 83 of each disc 66 are a plurality of upright blade members 84 each having a forward material engaging surface 85. The blade members 84 are of sufficient length to extend from an inner end closely spaced to the center of the upper discs surface 83 to a point near the outer periphery 86, and in the embodiment shown, along the length of the blade member 84, it is provided with a curvature so that as to provide the forward surface with a convex face.

Projecting rearwardly from each blade member at a lower edge thereof is a pair of lugs, an outer lug 87 and an inner lug 88. The inner and outer lugs 87, 88 have bottom surfaces which are perpendicular relative to the upstanding blade member for flat engagement with the upper surface 83 of the disc. The disc 66 is provided with a pair of threaded openings for each blade member 84, which openings are not necessarily on the same radial line extending from the center of the disc. Each of the lugs 87 and 88 are provided with slotted openings 90 and 91, respectively. Each of the slotted openings 90 and 91 are struck on arcuate line to allow the outer end of the blade member and the inner end of the blade member to be shifted in an arcuate direction about the center of the threaded opening at the opposite end thereof as depicted by the arrows B and C in FIG. 8. This allows a considerable amount of variation of the position at the forward surface 85 of each blade member 84 relative to a radial line drawn from the center of the disc. Once a position of the blade member is selected, tightening of bolts 92 and 93, which pass through the slotted openings 90 and 91 of the outer and inner lugs 87 and 88, respectively, are threaded into the pair of threaded openings in the disc.

Figure 11:
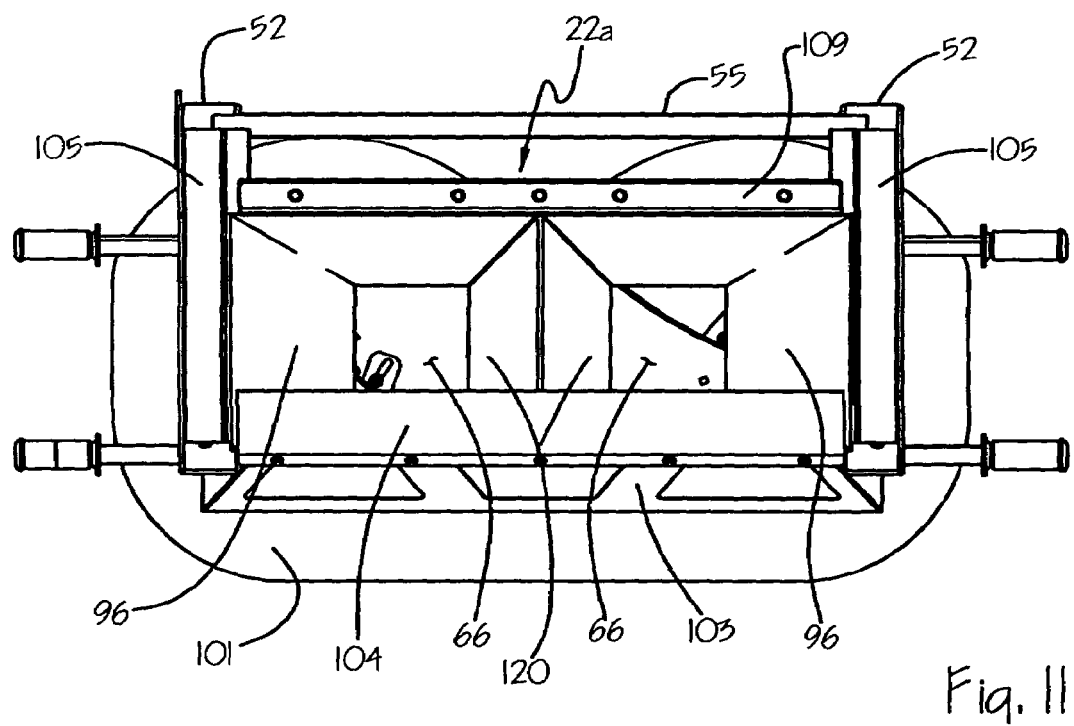
FIG. 11 is a top view of the broadcast apparatus with the hopper section of the embodiment of FIG. 10 in mounted position.
Figure 6:
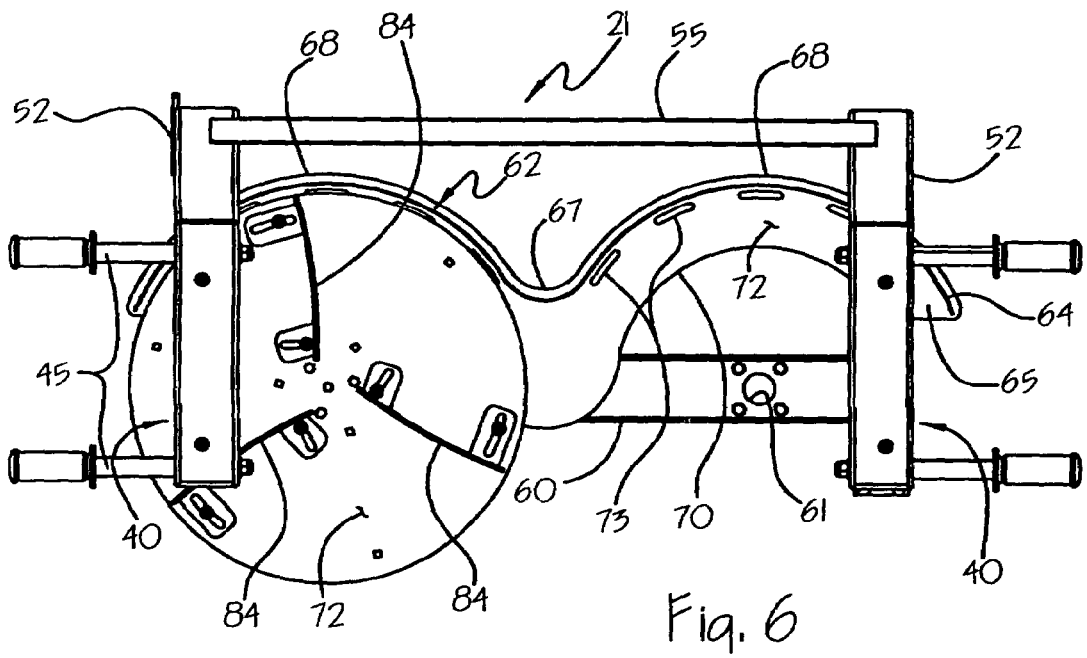
FIG. 6 is a plan view of the chassis section as shown in FIG. 5 and further illustrating the left hand spinner unit as mounted on the chassis.
Figure 7:
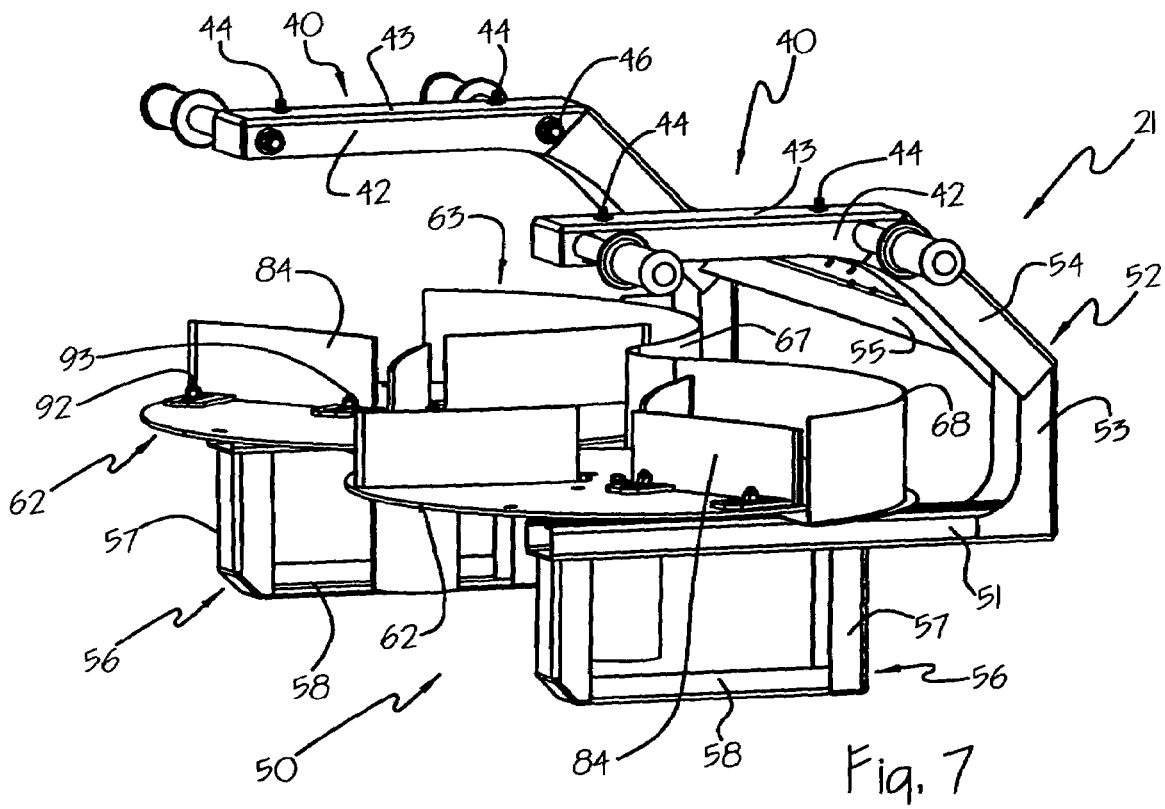
FIG. 7 is a side-rear perspective of the chassis section as shown in FIGS. 5 and 6, but with both spinners and associated motors mounted thereon.
Figure 8:
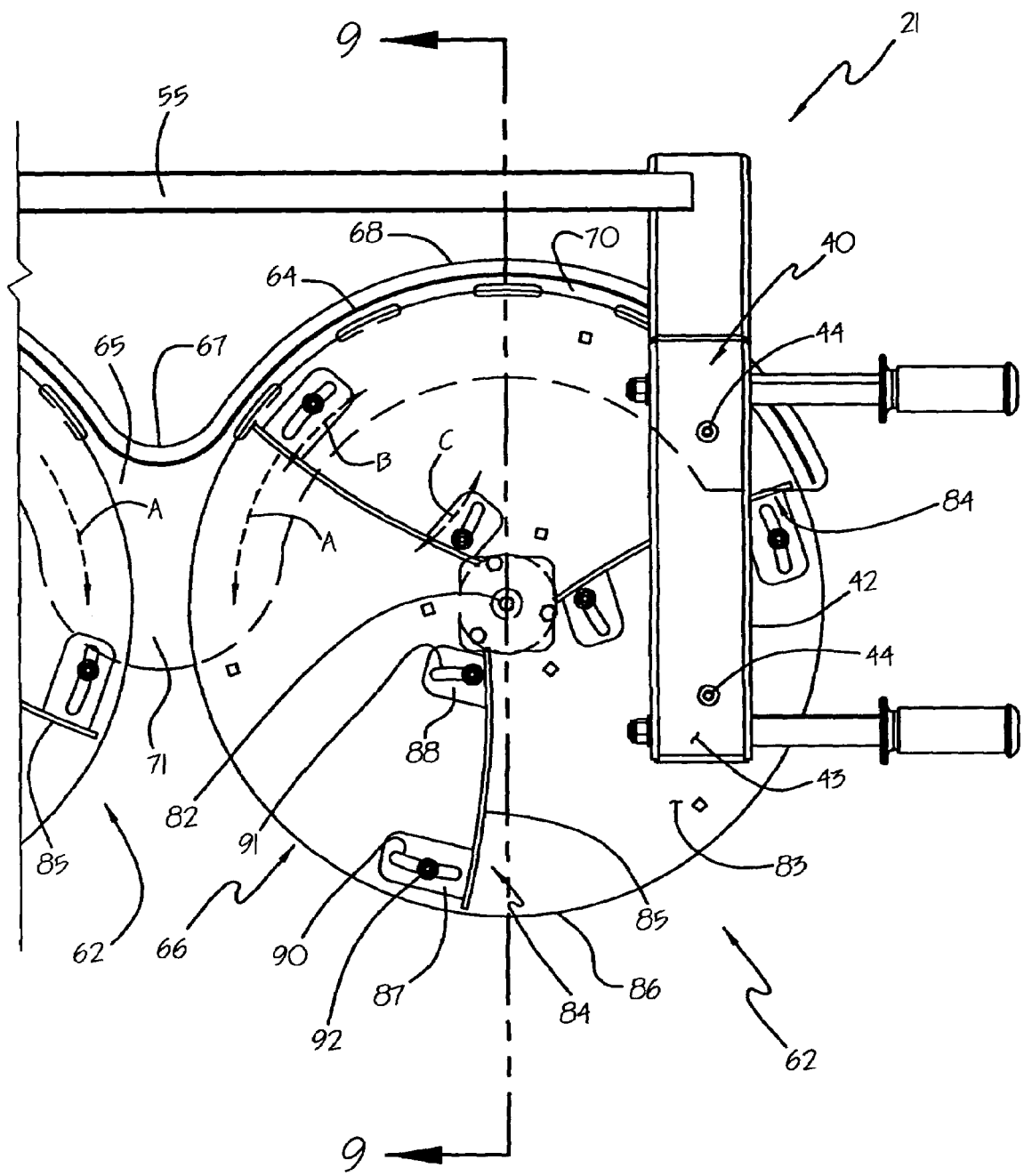
FIG. 8 is an enlarged top view of the right hand end portion of the chassis section as shown in FIG. 7 with the spinner unit mounted thereon.
Figure 10:
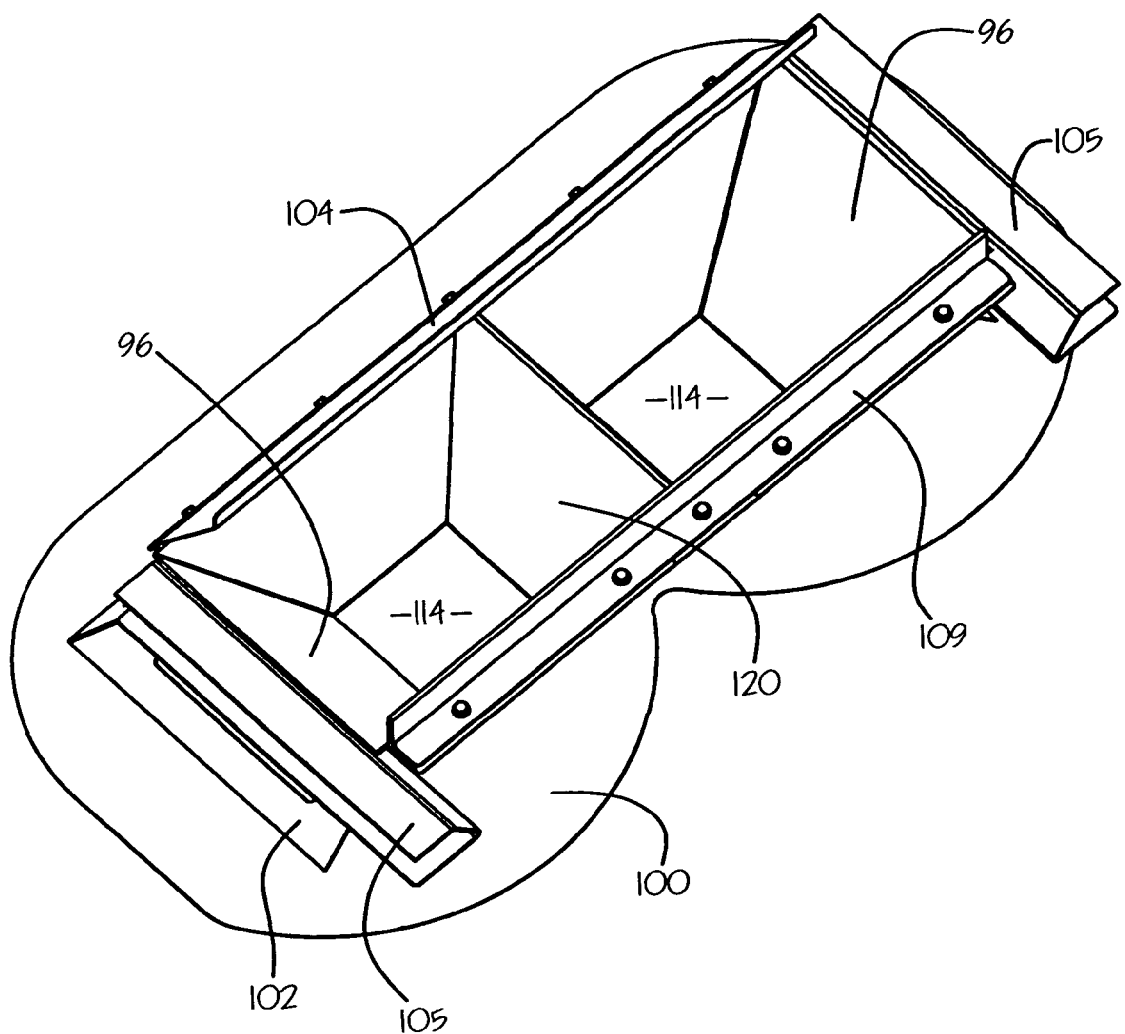
FIG. 10 is a perspective top view from the front of an alternative embodiment of a hopper section for the broadcast apparatus of the invention.

The hopper section 22 of the embodiment shown in FIGS. 1 to 4 and 9 is of a type used in spreading coarse or bulky materials, whereas the hopper section 22a, as shown in FIGS. 10 and 11, which can be readily substituted for the former, is of a type used on the same chassis section 21 when finer materials, such as sand, is being spread. The embodiment of the hopper section 22a has located midway between opposed side walls 96 a pair of downwardly diverging intermediate walls 120,120, thus providing a pair of bottom openings 114,114 disposed to be located one each over the pair of spinner units 62,62.

Figure 3:
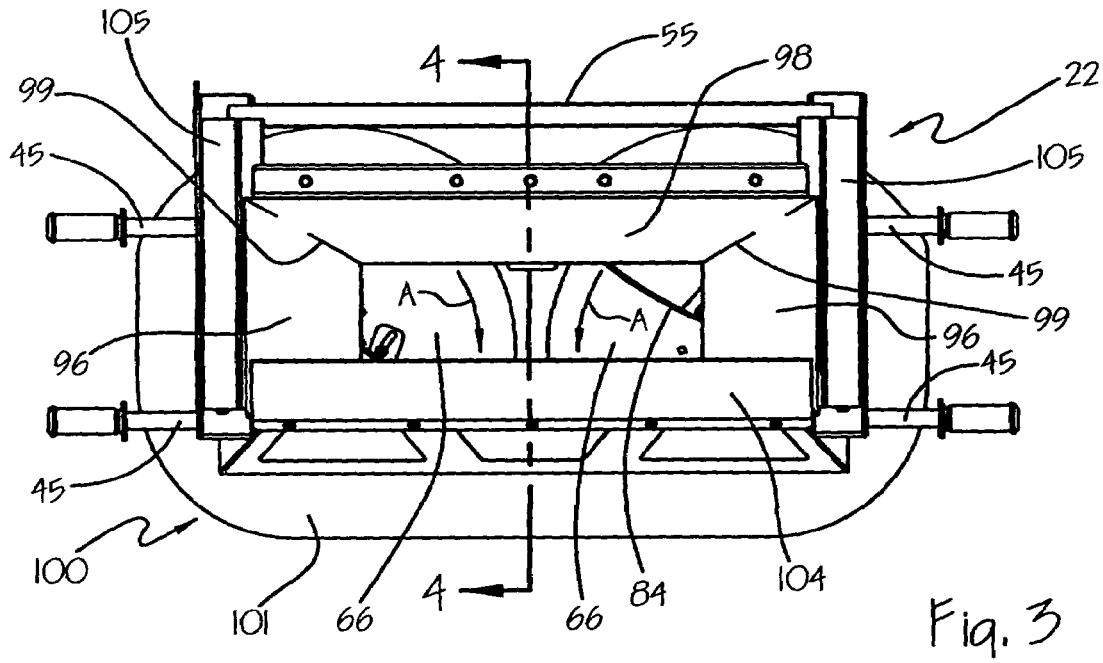
FIG. 3 is a top view of the embodiment of the broadcast apparatus as shown in FIG. 1.

As viewed in FIG. 3, the hopper forming portion 95 per se of the hopper section 22 includes a pair of side walls 96,96 which converge downwardly from the top of the hopper forming portion 95. A rear wall 97 (FIGS. 3 and 4) and a front wall 98 also converge downwardly from the top of the hopper section 22. The walls 96,96,97 and 98 are formed of steel metal and are joined at the diverging corners 99, such as by welding. The upper edges of walls 96,96,97 and 98 are in a substantially common horizontal plane as are the lower edges which are fastened, such as welding 94 to the edges of a rectangular opening in a horizontal disposed spinner cover plate 100, which is shaped to fully cover the pair of discs 66,66 as well as the spinner shield member 63. The cover plate 100 has a projecting rear portion 101 which extends some distance horizontally behind the discs 66,66. As shown in FIG. 4, for example, when the chassis section 21 and the hopper portion 22 are assembled, the cover plate 100 of the hopper section 22 is spaced only slightly above the top edges of the blade members 84 of the spinner units 62,62 installed in the chassis section 21 and immediately above the spinner shield member 63. The hopper forming portion 95 is reinforced by side support member 102 which are welded to the top surface of the cover plate 100 and slope inwardly to an area somewhat below the top edges of the side walls 96,96. At the rear of the hopper portion a rear support member 103 is welded to the top surface of the cover plate 100 and slopes inward to a top edge welded to rear wall 96 of the hopper forming portion 95 in the same plane as the top edges of side support members 102,102 of the side walls 96,96. The end edges of the rear support member 103 are welded to the rear end edges of the side support members 102. Attached to the top edge of the rear 97 of the hopper formed portion 95 is a rear deflecting plate 104 which slants forwardly somewhat over the material receiving opening defined by the upper edges of the walls 96,96, 97 and 98. This deflecting plate is provided to intersect any of the material which may be projected rearwardly as the material leaves the conveyor 24. A reinforcing member 109 is affixed along the forward side of the front wall of the hopper portion at its upper edge, which member is shown in the form of an angle iron.

Figure 1:
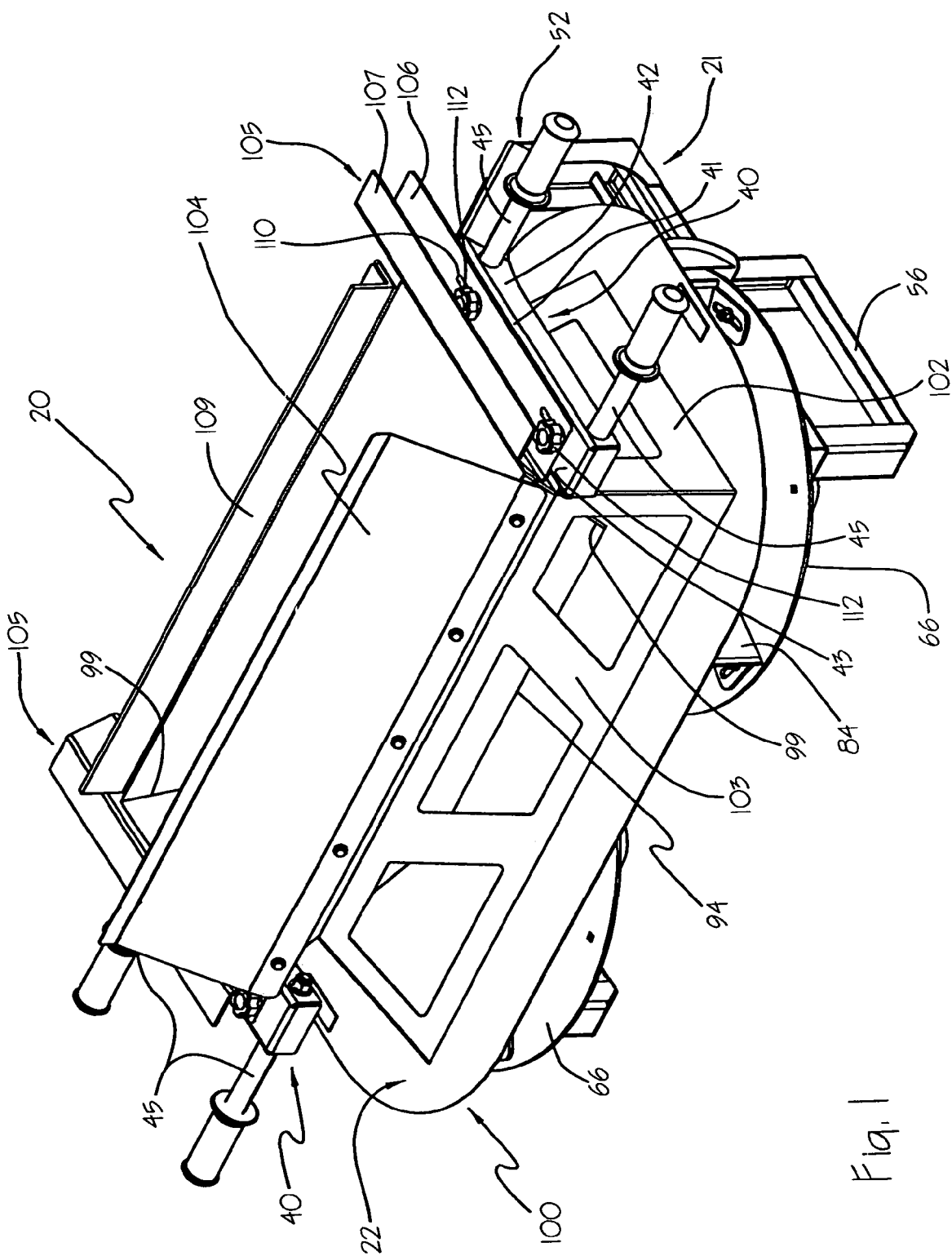
FIG. 1 is a perspective view of an embodiment of the broadcast, apparatus of the present invention as seen from a right hand rear corner thereof.

Immediately adjacent the top edges of the side walls, there are attached thereto, a pair of mounting rails 105,105, which extend in the fore and aft direction of the broadcast apparatus and have the same transverse spacing as the upper rails 40,40 of the chassis section 20. As shown in FIG. 1, the mounting rails 105,105 are somewhat longer than the upper rails 40,40 and have a forward end projecting beyond the forward ends of the upper rails 40,40 when the chassis section and the hopper section are assembled. The mounting rails 105, 105 are in the form of an outwardly open channel member having parallel lower and upper flanges 106,107 respectively, as well as a connecting web 108, which due to the slant of the side walls of the hopper portion 95 of the hopper section 22 against which the mounting rails are welded, is not at right angles to the horizontally projecting flanges 106,107. When assembled as an operating broadcast apparatus the lower flange 106 of each mounting rail 105 directly to overlays the upper web 41 of the corresponding upper rail 40, the lower flange 106 being provided with properly located openings 110 for reception of the upwardly projecting studs 44,44 of the upper rail as the lower surface of the flange 106 comes into contact with the upper surface 43 of the upper rail 40. The studs 44,44 are of a length to project completely through the openings 110 which are elongated.

In the illustrated embodiments of the invention, the clamping means of the material transporter 23, consisting of the forward support units 34,34 and the rearward manually operable locking clamp 35,35 interact with opposite ends of the mounting rails 105,105 which are part of the hopper section, whether the hopper section be either the embodiment 22 or 22a. As most easily seen in FIG. 2, the support units 34,34 enter the forward ends of the mounting rails 105,105 on opposite sides of the hopper section. Subsequent action of each of the pair of locking clamps 35 by pushing down on a lever 115 moves them into a locking condition. Due to a reaction of an over-center movement as the lever 115 is pushed down, a rod 116 which is connected to the rearwardly projecting side wall 36 of the material transporter 23 pulls a downwardly extending hook portion 117 of the locking clamp tightly into the rear end of the mounting rail 105.

The chassis section 21 can be readily moved manually from one site to another when separated from the material transporter 23 and from the hopper section 20 by two persons on opposite sides of the chassis section grabbing the opposite pairs of handles 45,45 and lifting and carrying it. In this separated condition all parts of it are readily available for maintenance or replacement. Depending on the type of material to be spread, the orientation of the blade members 84 may be readily adjusted at this stage. The blade member 84 may be loosened from the disc surface 83 by turning the outer and inner bolts 92,93. The blade members can then be shifted to a new position before retightening the bolts.

Again, depending on the type of material to be spread, an appropriate type of hopper section 22 is selected. While two different embodiments 22 and 22a of the hopper forming portion 93 have been illustrated, other forms which are designed for feeding the material through the bottom opening of the hopper form portion 95, or openings 114,114 in the case of hopper section 22a, and into the top of the spinner units 62,62, may be found desirable, depending on the nature of the material to be spread. While the type of the hopper forming section 22 which is termed a bulk hopper is preferable for particles which are very coarse as well as materials which clump together, such as grass clippings, bark mulch and lawn covers. The spreading of finer materials, such as sand and some light soils is accomplished more even with the type of hopper section, which is referred to as a sand hopper, a separate opening 114 positioned above a corresponding spinner unit as shown for hopper section 22a. With proper settings, this latter form of hopper is useful for other coarser material of equivalent, particulate material, such as crushed rock, drain rock or cart path material.

Having positioned the blade members 84 in the chassis section 21 and selected the form of the hopper section 22 or 22a, the hopper section is lifted over the chassis section by hand and lowered on to the chassis so that the four threaded studs 44 on the upper rails 40,40 of the chassis section project through the elongated opening 110 in the lower flanges 106,106 of the mounting rails 105,105 of the upper section 22 or 22a. Again, depending on the type of material to be spread the hopper section is moved either forwardly or rearwardly due to the movement permitted by the threaded studs 44 being received in the elongated openings 110. When the relatively positioning of the hopper section 22 on the chassis section 21 has been completed, the four internally threaded knobs 112 are tightened by hand onto the threaded studs 44 to bring the lower surface of the flanges 106 of the mounting rail, 105,105 into tight engagement with the upper surfaces 43,43 of the upper rails 40. This locks the two sections together to form an integral broadcast apparatus and holds the two in a set relationship, the latter being important as the prior shifting of the two sections results in the relative movement of the outlet opening at the bottom of the hopper forming portion of the hopper section 22 relative to the top of the spinner units 62,62. The effect of varying the position of entry of the material 26 into the blade members 84 is important in establishing the pattern of distribution of the particles of the material 26.

Having tightened the knobs 112, the assembled unit can be lifted, again by two persons using the lateral projecting handles 45 to a position where the broadcast apparatus as a whole is moved towards the back of the material transporter 23 so that the forward support units 34,34 of the material transporter 23 are received in the forward end of the mounting rails 105,105, thus supporting the forward part of the broadcast unit by the upper flange 107 of the mounting rails. The rear of the mounting rails is then levelled for reception of the hook portions 117 of the rear locking clamps 35 as the levers 115,115 are pushed down, thereby pulling the locking clamps 35 into engagement with the rear of the mounting rails 105,105 so as to tightly hold the mounting rails tight relative to the material transporter 23 (FIG. 2). At this time the hydraulic lines 77,77 of the material transporter 23 are connected to the speed control valve 76 which is set for a selected speed, again taking into account the type of material to be spread. The flow of hydraulic fluid through the lines 77 is normally controlled by a valve on the material transporter 23 or the towing vehicle.

It may be noted that once the assembled broadcast apparatus 20 is mounted on the material transporter 23 ready for spreading or at any time during the spreading operation, its spreading characteristic for the particular material involved can be varied by shifting the relative position of the single outlet or outlets 114,114 of the hopper section to the part of the discs 66,66 onto which the material flows from the outlet. To make such an adjustment, it is necessary to loosen the knobs 112 only sufficiently to allow the operator, to slide the chassis section 21 in a forward or rearward direction by pushing the handles 45 in that direction. This causes the sifting of the chassis section 21 and the related chassis parts carried thereby, including the discs 66,66 and spinner sheets 63, in the directions indicated by the double-headed arrow D (FIGS. 4 and 9). It is to be appreciated that while the illustrated embodiment of the invention shows an embodiment in which the hopper section 22 provides mounting rails 105,105 which are clamped relative to the material transporter frame with the upper rails 40,40 of the chassis section 21 being moveable relative to the mounting rails once the two sections are no longer tightly clamped together, an alternative arrangement is substantially as effective. Such an alternative embodiment would involve, for example, that of simply arranging the upper rails 40,40 for receiving the clamping means of the material transporter 23 whereby on releasing the interconnecting means between the chassis section and the 16hopper section, such as already described as being threaded studs and associated internally threaded knobs or the like, the hopper section could be shifted relative to the chassis section, which is fixed relative to spreader, before retightening the interconnecting means between the two sections.

It has been found that in spreading various materials with the broadcast apparatus of this invention, proper combinations of settings can be established for obtaining very uniform distribution patterns along the path being covered. It is apparent from the relatively simple design described above, that there is provided by the structure, a broadcast apparatus which is convenient and inexpensive to produce and maintain while being light to handle. It is further apparent that the versatility of the broadcast apparatus, resides in the ability to switch, for example, from spreading bulk materials to that of spreading fine or equivalent particulate material in a manner of a few minutes. In spreading the bulk materials, it can be observed from the view through the outlet opening in the bottom of the hopper forming portion as seen in FIG. 3, that the material is affected by the action of both exposed portions of the two discs 66,66 together travelling in the direction of the arrows A—A. It has been found that the best separation and dispersal of this type of material is accomplished with the chassis section moved to rearwardly relative to the hopper section. On the other hand, in order to obtain optimum spreading of very fine material such as sand, it has been found that it is better to have the sand particles landing separately and only on the upper surfaces of the two discs so as to require the use of the form of the hopper illustrated in FIG. 11. It has been further established that to obtain an even pattern of distribution, it is preferable to arrange the setting of the relative positions of the chassis section 21 and the hopper section 22a, to provide the longest period of contact between each sand particle and the forward surface 88 of the blade members. This requires the shifting of the chassis section 21 to its forward position relative to hopper section 22a. Moreover, it is preferable with this type of material to reposition the relative position of the blade members 84 on the discs 66,66 to further accomplish the prolonged contact between the blade members and the sand particles.

Although only a single embodiment has been illustrated in relation to the chassis section and other associated parts, it is apparent that variations will be obvious to those skilled in the art without departing from the spirit of the invention as defined in the appending claims.

The invention claimed is:

1. A broadcast apparatus for attachment to a material transporter for receiving material from the material transporter and distributing the material on a path along a ground surface as the material transporter travels over the ground surface, the material transporter having attached mounting means for said broadcast apparatus comprising:
   a chassis section,
   at least one spinner unit,
   at least a first hopper section,
   said chassis including: mounting means, a lower horizontal frame portion, and frame members suspending said lower frame portion spaced below said upper mounting means,
   said spinner unit being mounted on said lower frame portion and including, a power driven disc having a substantially horizontal circular, upper surface, and a plurality of upright blade members affixed to said upper surface
   said hopper section including a hopper portion defining an upper inlet opening for receipt of material from said material transporter and a lower outlet above said upper surface of said upper surface of said disc, and mounting rails disposed for engagement with said upper mounting means of said chassis section, and
   interconnecting means detachably connecting said mounting rails of said hopper section to said mounting means of said chassis section in a plurality of positions for permitting variable placement of said lower outlet of said hopper section relative to said upper surface of said disc,
   one of said chassis and said hopper section providing areas for interaction with said attachment mounting means of said material transporter for detachably mounting said broadcast apparatus on said material transporter.

2. A broadcast apparatus as defined in claim 1, wherein:
   said mounting means of said chassis section includes a pair of upper, laterally spaced elongated upper rails extending in the direction of travel of the material transporter; and
   said mounting rails of said hopper section are disposed adjacent said upper inlet opening.

3. A broadcasting apparatus as defined in claim 2, wherein:
   said lower frame portion includes a pair of lower rails spaced below and being parallel to said upper rails of said chassis; and
   said frame members suspending said lower frame portion from said upper mounting means includes a pair of upright frame members each rigidly connecting a forward end of one of said upper rails to a forward end of the corresponding lower rails.

4. A broadcast apparatus as defined in claim 3, wherein:
said lower frame portion includes a horizontal support member attached at opposite ends to said lower rails behind said upright frame members, and wherein:
a pair of said spinner units are mounted on said horizontal frame member in side-by-side relation;
each of said spinner units including,
a horizontally disposed flat circular disc above said horizontal support member and motor means for driving said discs about parallel, vertical, laterally spaced axes.

5. A broadcast apparatus as defined in claim 4, wherein:
said discs each have an upper surface, and further comprises:
a plurality of spaced blades affixed in an upright fashion relative to said upper surface with upper edges of said blades spaced above said upper surface.

6. A broadcast apparatus as defined in claim 5, wherein:
each blade is elongated, extending from an inner end in proximity to a center of said circular disc to an outer end located closer to an outer periphery of said circular disc.

7. A broadcast apparatus as defined in claim 6, wherein:
said blade is of curved configuration presenting a convex forward face along its length in relation to the rotation direction of the discs.

8. A broadcast apparatus as defined in claim 7, wherein:
each blade is provided with a pair of adjustable attachment means spaced along the length thereof permitting independent adjustment of the distance of opposite ends of said blade away from a common radial line extending outward from the center of said circular disc.

9. A broadcast apparatus as defined in claim 3, wherein:
said lower frame portion includes downwardly extending stand members secured to said lower rails and providing ground engaging support members spaced below said lower rails for mounting said lower frame section a distance above the ground when said broadcast apparatus is demounted from said material transporter.

10. A broadcast apparatus as defined in claim 5, and further comprising:
a spinner shield member carried by said lower frame in front of forward portions of said discs of said spinner units,
said shield member in cross section having a right angle shape formed by an upright flange joined to a bottom horizontal flange,
said upright flange projecting upwardly to an upper edge at least at the level of said upper edges of said blades,
said horizontal flange extending rearwardly below forward portions of said discs,
said horizontal flange having a series of openings disposed therethrough approximately below the periphery of said discs of said spinner units.

11. A broadcast apparatus as defined in claim 1, and further comprising:
a second interchangeable hopper section including mounting rails of the same structure as said first hopper section, and wherein:
said hopper portion of said first hopper section and a hopper portion of said second hopper section have interior structures for providing different flow characteristics of material therethrough from said upper inlet opening to at least one lower outlet opening.

12. A broadcast apparatus as defined in claim 11, wherein:
said hopper portion of said first hopper section has downwardly converging side walls and downwardly diverging front and rear walls,
said walls defining a single lower opening elongated in the transverse direction and extending across portions of both of said circular discs of the pair of spinner units.

13. A broadcast apparatus as defined in claim 4, and further comprising:
a second interchangeable hopper section including mounting rails of the same structure as said first hopper section, and wherein:
said hopper portion of said first hopper section and a hopper portion of said second hopper section have interior structures for providing different flow characteristics of material therethrough from said upper inlet opening to at least one lower outlet opening,
said hopper portion of said second hopper section has a pair of downwardly converging side walls, each side wall having an opposed center wall whereby said hopper portion has a pair of side-by-side lower outlets, one each being located over a portion of one of said circular discs of said pair of spinner units.

14. A broadcast apparatus as defined in claim 13, wherein:
the hopper sections each include a horizontal cover member overlying discs of said spinner units and defining said at least one lower outlet opening above spinner units.

15. A broadcast apparatus as defined in claim 1, wherein:
said mounting means of said chassis includes a pair of laterally spaced elongated upper rails extending in the direction of travel of the material transporter,
said mounting rails of said hopper section include a pair of elongated mounting rails extending in the direction of travel of the material transporter and being laterally spaced for engagement with said elongated upper rails of said chassis section.

16. A broadcast apparatus as defined in claim 15 wherein:
said upper rails of said chassis section and said mounting rails of said hopper section have engaging surfaces,
the engaging surfaces of said upper rails of said chassis section being in contact one each with the engaging surfaces of said mounting rail, and
said interconnecting means holding said surfaces in engaging and providing the sole connecting for mounting said chassis section and said hopper section together as an operating broadcast unit.

17. A broadcast apparatus, as defined in claim 16, wherein:
said interconnecting means includes:
a plurality of threaded studs projecting from the engaging surfaces of one of said pair of rails,
the other of said pair of rails is provided with a plurality of openings elongated in said longitudinal direction and located for reception of said threaded studs, and wherein;
internally threaded members are provided for tightening on said threaded studs for applying holding said contact surfaces in engaging and preventing longitudinal shifting of one section relative to the other.

18. A broadcast apparatus as defined in claim 1, wherein said one of said pair of mounting rails of said chassis and said hopper section provide said areas of interaction with said attachment mounting means of said material transporter.

* * * * *